No. 644,431. Patented Feb. 27, 1900.
S. KAROLEWSKI.
NUT LOCK.
(Application filed Dec. 21, 1899.)
(No Model.)

WITNESSES:
J. P. Appleman
A. McHaymaker

INVENTOR
Stanislaw Karolewski
BY
H. C. Evert & Co.
ATTORNEYS.

THE NORRIS PETERS CO., PHOTO-LITHO., WASHINGTON, D. C.

United States Patent Office.

STANISLAW KAROLEWSKI, OF PITTSBURG, PENNSYLVANIA.

NUT-LOCK.

SPECIFICATION forming part of Letters Patent No. 644,431, dated February 27, 1900.

Application filed December 21, 1899. Serial No. 741,130. (No model.)

*To all whom it may concern:*

Be it known that I, STANISLAW KAROLEWSKI, a citizen of the United States of America, residing at Pittsburg, in the county of Allegheny and State of Pennsylvania, have invented certain new and useful Improvements in Nut-Locks, of which the following is a specification, reference being had therein to the accompanying drawings.

My invention relates to certain new and useful improvements in nut-locks, and aims to produce a nut-lock which is simple in construction, easily adjusted in place, and positive in its action, rendering it impossible for the nut to work loose from the bolt.

A further object of my invention is to improve the construction of nut-locks and to provide a simple, inexpensive, and efficient device adapted for use on railroads, bridges, machinery, and other constructions subject to vibrations, and capable of securely locking the nut against accidental unscrewing and to permit the nut to be readily removed when desired without injuring the device.

In describing the invention in detail, reference is had to the accompanying drawings, forming a part of this specification, and wherein like numerals of reference indicate corresponding parts throughout the several views, in which—

Figure 1:
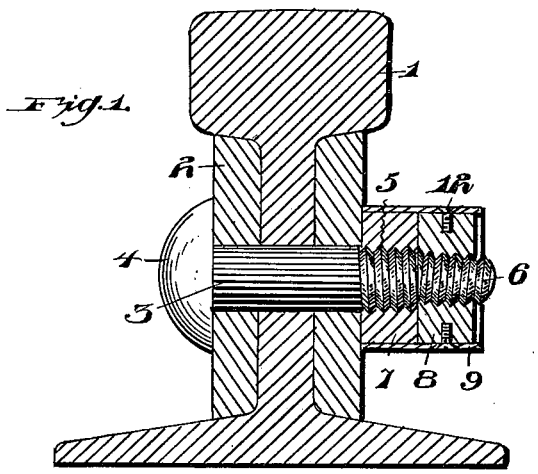
Figure 2:
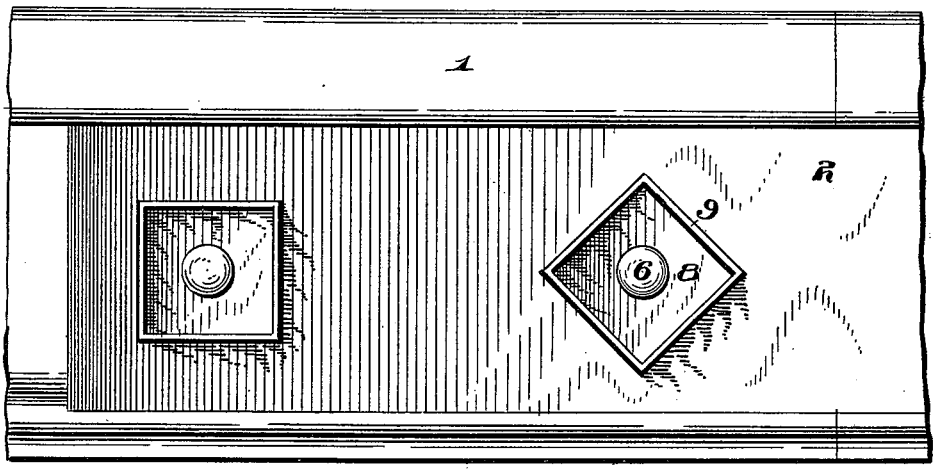
Figure 3:
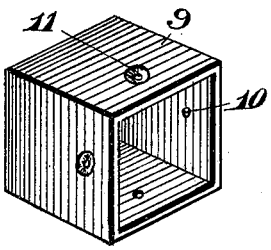

Figure 1 is a vertical sectional view of a railroad-rail, showing my improved nut-lock in position. Fig. 2 is a side plan view of a rail and my improved nut-lock. Fig. 3 is a perspective view of my improved securing-cap for the nuts.

Referring to the drawings by reference-numerals, 1 indicates an ordinary rail, and 2 represents a fish-plate secured to each side thereof and through which is inserted a bolt 3, provided at one end with a head 4 and at its opposite end with a series of screw-threads. The screw-threaded portion of the nut is of two different diameters, the larger, (indicated by the reference-numeral 5) being provided with right-hand screw-threads, and the smaller (indicated by the reference-numeral 6) with left-hand screw-threads. The right-hand screw-threads 5 are adapted to receive an ordinary nut 7, which is screwed up in the usual manner against the fish-plate or other object to be held, and the outer left-hand screw-threads are adapted to receive a securing-nut 8. These nuts are substantially square in contour, and the nut 8 is provided with a screw-threaded recess in each of its sides.

9 indicates a fastening-sleeve, which is mounted upon both of the nuts and extends outwardly from the securing-nut 8. This sleeve is provided with an opening 10 in each side thereof, registering with the countersunk recesses 11, formed on the outer face of each side. The openings 10 register with the screw-threaded recesses formed in the securing-nut 8. The sleeve 9 is retained in position by means of screws 12, which are secured in the recesses formed in the nut 8, and the heads of these screws are countersunk within the recesses 11, formed in the fastening-sleeve.

It will be seen that the nut-lock is simple and comparatively inexpensive in construction, that it is reliable in operation, and that it is capable of securely locking the nut against accidental unscrewing, and attention is particularly called to the fact that the securing-nut is formed with a series of screw-threaded recesses to receive screws 12 and that the heads of the screws are countersunk in the fastening-sleeve. This enables the removal of the nuts when desired without injuring any part of the nut-lock.

It is thought that the many advantages of my improved nut-lock can be readily understood from the foregoing description, taken in connection with the accompanying drawings.

It will be noted that various changes may be made in the details of construction without departing from the general spirit of my invention.

Having thus fully described my invention, what I claim as new, and desire to secure by Letters Patent, is—

The combination with a bolt provided with a screw-threaded portion of two different diameters, one of which is provided with right-hand screw-threads and the other with left-hand screw-threads, of a nut mounted upon said larger diameter of said bolt, of a nut mounted upon said smaller diameter of said bolt and provided with a screw-threaded recess centrally of each side and which extend in a vertical and horizontal manner, a sleeve mounted upon said nuts and adapted to have its inner end flush with the object the bolts extend through and the opposite or outer end extending over the said bolt, said sleeve provided centrally of each side thereof with an opening registering with one of the recesses arranged in the sides of the nut, and a screw extending through each of the openings of the said sleeve and secured in the registering recess, and said screws having their heads countersunk in the said sleeve, substantially as described.

In testimony whereof I affix my signature in the presence of two witnesses.

STANISLAW $\overset{\text{his}}{\times}$ KAROLEWSKI.
mark

Witnesses:
JOHN NOLAND,
E. W. ARTHUR.